(12) United States Patent
Arikat

(10) Patent No.: US 9,692,864 B1
(45) Date of Patent: Jun. 27, 2017

(54) ATTACHABLE COSMETICS CASE FOR A CELLULAR PHONE

(71) Applicant: Michael Arikat, Petaluma, CA (US)

(72) Inventor: Michael Arikat, Petaluma, CA (US)

( * ) Notice: Subject to any disclaimer, the term of this patent is extended or adjusted under 35 U.S.C. 154(b) by 0 days.

(21) Appl. No.: 15/069,301

(22) Filed: Mar. 14, 2016

(51) Int. Cl.
*A45D 33/32* (2006.01)
*H04B 1/3883* (2015.01)
*H02J 7/00* (2006.01)
*H04M 1/21* (2006.01)

(52) U.S. Cl.
CPC .............. *H04M 1/21* (2013.01); *A45D 33/32* (2013.01); *H02J 7/0044* (2013.01); *H04B 1/3883* (2013.01)

(58) Field of Classification Search
CPC ...... H04M 1/21; H02J 7/0044; H04B 1/3883; A45D 33/32
See application file for complete search history.

(56) References Cited

U.S. PATENT DOCUMENTS

| | | |
|---|---|---|
| 7,146,184 B1 | 12/2006 | Tsitsiashvili |
| 8,418,852 B2 | 4/2013 | Ziemba |
| 8,602,039 B1 | 12/2013 | Gindi |
| 2006/0125445 A1* | 6/2006 | Cao ........................ H02J 7/0031 320/112 |
| 2008/0245383 A1* | 10/2008 | Tomandl .............. A45D 33/008 132/200 |
| 2009/0166247 A1* | 7/2009 | Gindi .................. A45D 33/008 206/581 |
| 2012/0279516 A1* | 11/2012 | Bouix .................. A45D 33/008 132/301 |
| 2014/0268518 A1* | 9/2014 | Huang ................. H04B 1/3883 361/679.01 |

\* cited by examiner

*Primary Examiner* — Dinh P Nguyen
(74) *Attorney, Agent, or Firm* — Stevenson IP, LLC

(57) ABSTRACT

An attachable cosmetics case for a cellular phone including a substantially rectangular case having a substantially rectangular primary storage compartment and a U-shaped back side having a right wing, a left wing, and an elongated substantially linear middle portion. A top lid is hingedly attached to the case. A cellular phone charging connector plug is medially disposed on a middle portion of the back side of the case. A charging port is disposed on a right side of the case, and a headphone port is disposed on a left side of the case. A plurality of secondary storage compartments and an applicator compartment is disposed within the primary storage compartment of the case. The case is removably attachable to a cellular phone, with the cellular phone charging connector plug disposed within a charging port of the cellular phone.

2 Claims, 5 Drawing Sheets

ATTACHABLE COSMETICS CASE FOR A CELLULAR PHONE

BACKGROUND OF THE INVENTION

Various types of attachments for cellular phones are known in the prior art. However, what has been needed is an attachable cosmetics case for a cellular phone including a substantially rectangular case having a substantially rectangular primary storage compartment and a U-shaped back side having a right wing, a left wing, and an elongated substantially linear middle portion. What has been further needed is a top lid hingedly attached to the case, a cellular phone charging connector plug medially disposed on a middle portion of the back side of the case, a charging port disposed on a right side of the case, and a headphone port disposed on a left side of the case. Lastly, what has been needed is a plurality of secondary storage compartments and an applicator compartment disposed within the primary storage compartment of the case. The case is removably attachable to a cellular phone, with the cellular phone charging connector plug disposed within a charging port of the cellular phone. The attachable cosmetics case for a cellular phone thus easily plugs into a user's cellular phone and allows the user to accessorize his phone with a multi-color eye shadow palette. With a rechargeable battery disposed within the case, the attachable cosmetics case further allows the user to charge his cellular phone.

FIELD OF THE INVENTION

The present invention relates to attachments for cellular phones, and more particularly, to an attachable cosmetics case for a cellular phone.

SUMMARY OF THE INVENTION

The general purpose of the present attachable cosmetics case for a cellular phone, described subsequently in greater detail, is to provide an attachable cosmetics case for a cellular phone which has many novel features that result in an attachable cosmetics case for a cellular phone which is not anticipated, rendered obvious, suggested, or even implied by prior art, either alone or in combination thereof.

To accomplish this, the present attachable cosmetics case for a cellular phone includes a substantially rectangular case having a right side, a left side, a front side, a bottom side, an open top side, a pair of rounded lower corners, a continuous outer edge disposed along the top side, a substantially rectangular primary storage compartment, and a concave U-shaped back side. The back side has a rearwardly extended right wing, a rearwardly extended left wing, and an elongated substantially linear middle portion. A substantially rectangular top lid has an interior surface, an exterior surface, and a linear top surface hingedly attached to the outer edge of the case adjacent to the middle portion of the back side. A perimeter of the top lid substantially conforms to a perimeter of the top side. The top lid has an open position and an alternate closed position. The top lid is in the open position when a gap is disposed between the top lid and the top side. The top lid is in the closed position when the top lid is disposed directly atop an entirety of the top side.

The attachable cosmetics case for a cellular phone further includes a battery compartment disposed within the case. A rechargeable battery is disposed within the battery compartment. A cellular phone charging connector plug is medially disposed on the middle portion of the back side of the case. A charging port is disposed on the right side of the case proximal the right wing of the back side. A headphone port is disposed on the left side of the case proximal the left wing of the back side. A distance between the right wing of the back side of the case and the left wing of the back side of the case substantially conforms to a width of a cellular phone.

A plurality of substantially rectangular secondary storage compartments is disposed within the primary storage compartment of the case proximal the front side. Each of the secondary storage compartments is configured to fit a block of makeup including, but not limited to, a square of pressed or loose eye shadow typically found in an eye shadow compact. The plurality of secondary storage compartments is optionally three in order to fit a standard size eye shadow palette. An elongated rectangular applicator compartment is disposed within the primary storage compartment adjacent to the plurality of secondary storage compartments proximal the back side of the case. The applicator compartment is configured to fit a makeup applicator brush. A mirror is disposed on the interior surface of the top lid. A plurality of light emitting diodes is continuously disposed between an exterior edge of the mirror and an external surface of the top lid.

The case is removably attachable to the cellular phone. The cellular phone charging connector plug is disposed within a charging port of the cellular phone, and a bottom portion of the cellular phone is disposed between the right wing of the back side of the case and the left wing of the back side of the case when the case is attached to the cellular phone. The rechargeable battery, the cellular phone charging connector plug, the plurality of light emitting diodes, the charging port, the headphone port, and the cellular phone are in operational communication with each other. It is envisioned that the case can be similarly structured to attach to any personal electronic device, not just the cellular phone.

Thus has been broadly outlined the more important features of the present attachable cosmetics case for a cellular phone so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
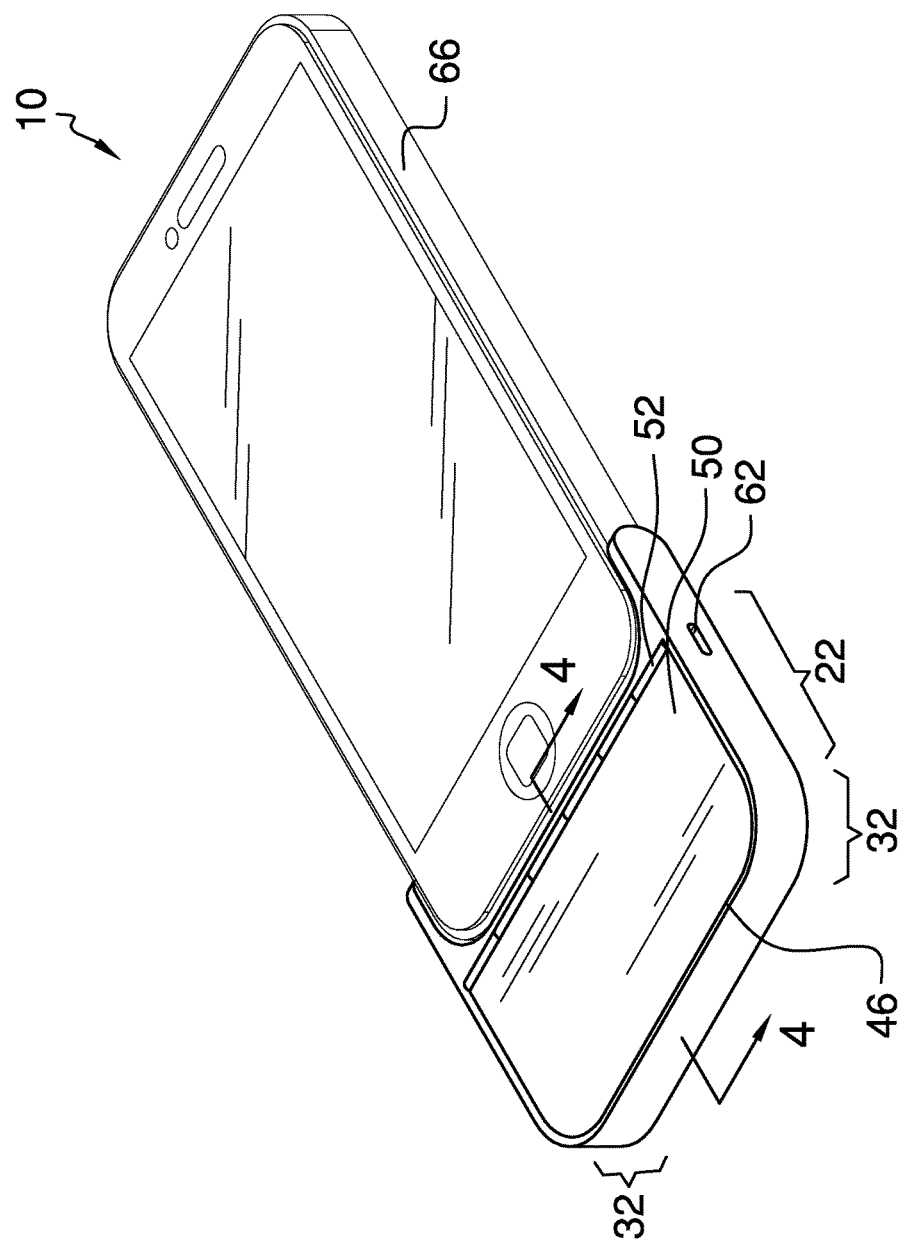
FIG. 1 is a front isometric view.
Figure 2:
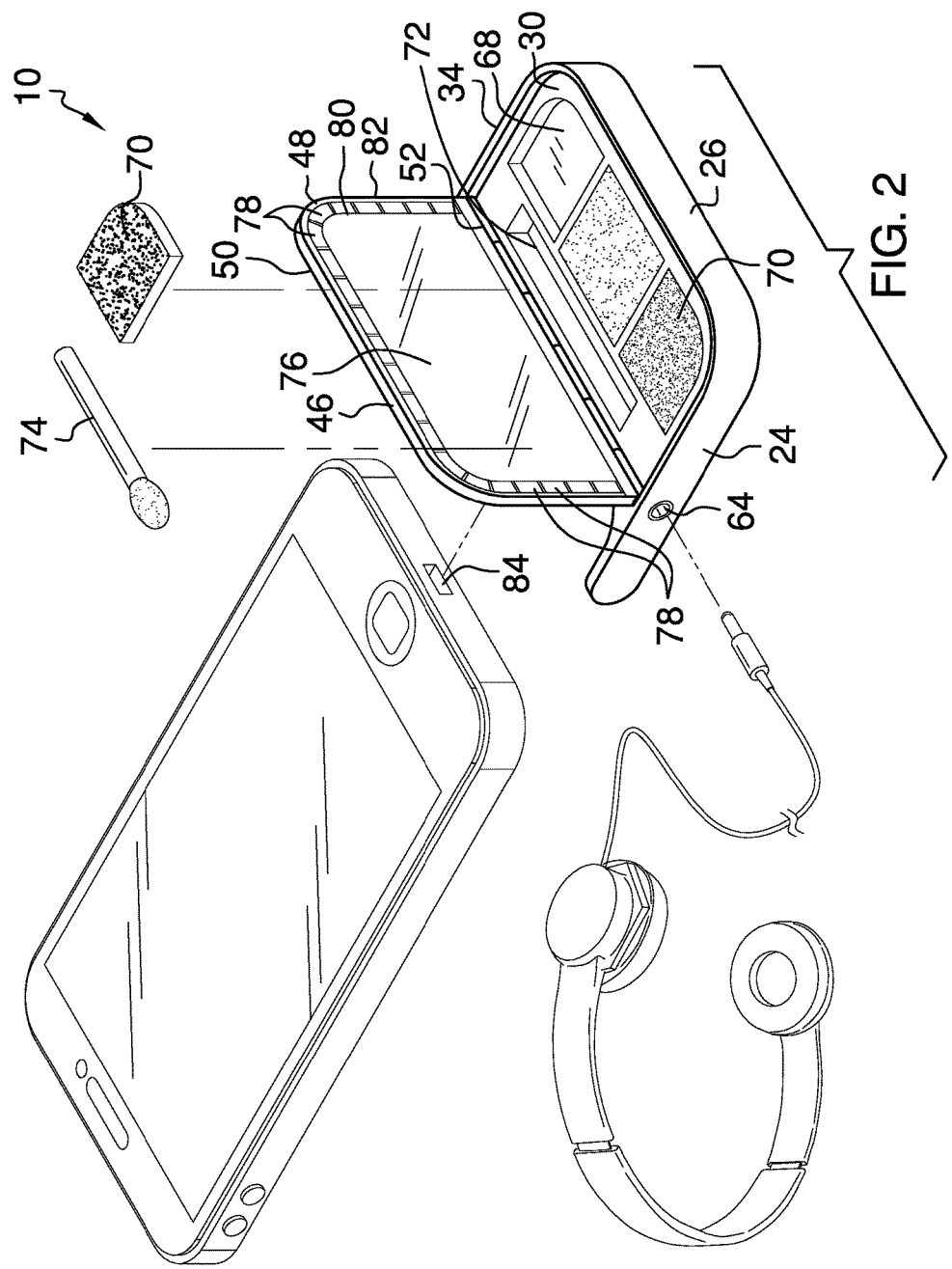
FIG. 2 is an exploded view.
Figure 3:
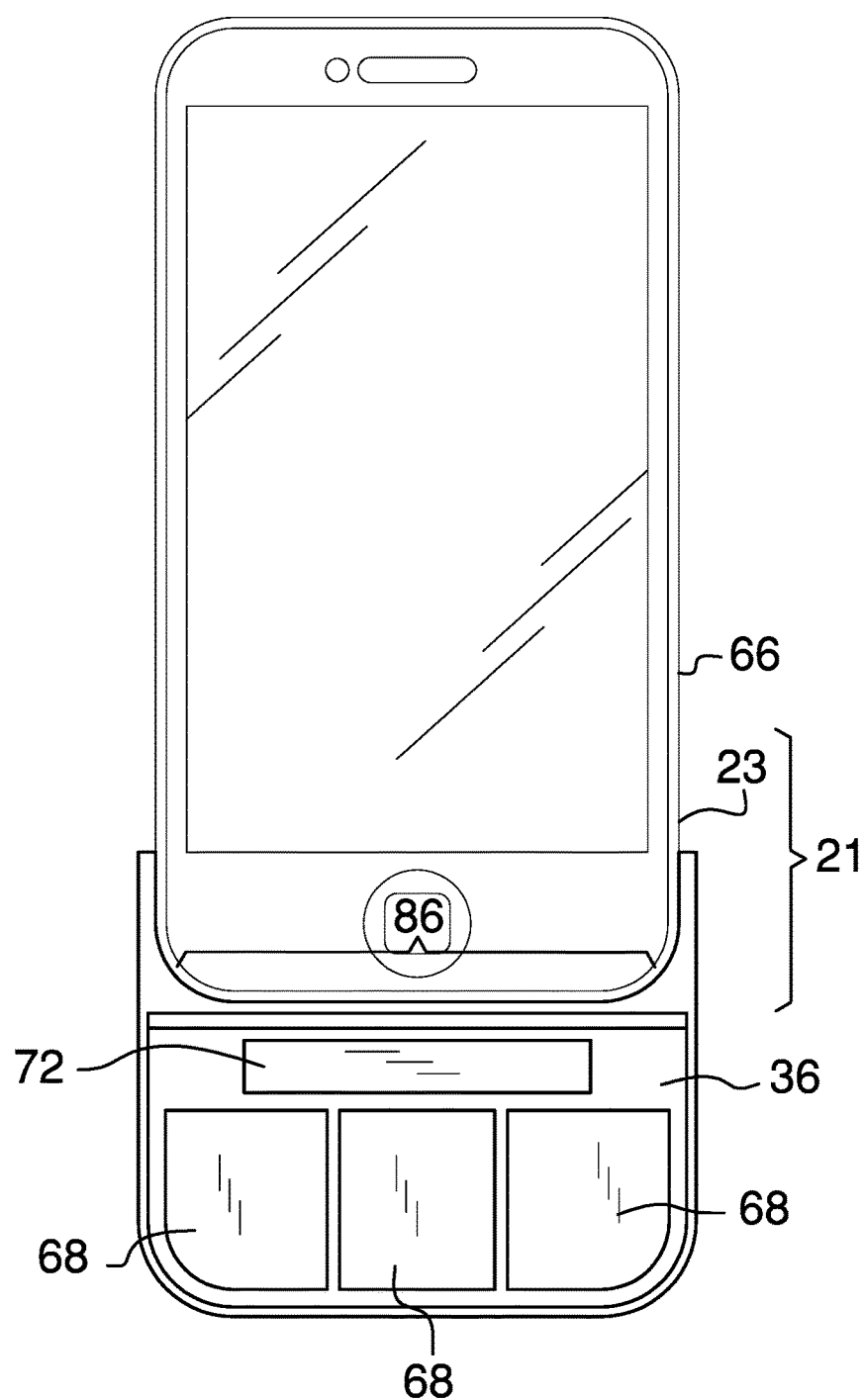
FIG. 3 is a top plan view.
Figure 4:
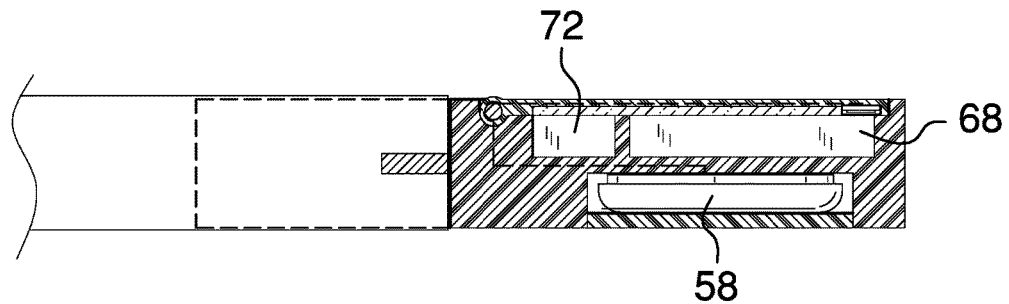
FIG. 4 is a cross-sectional view taken along line 4-4 of FIG. 1.
Figure 5:
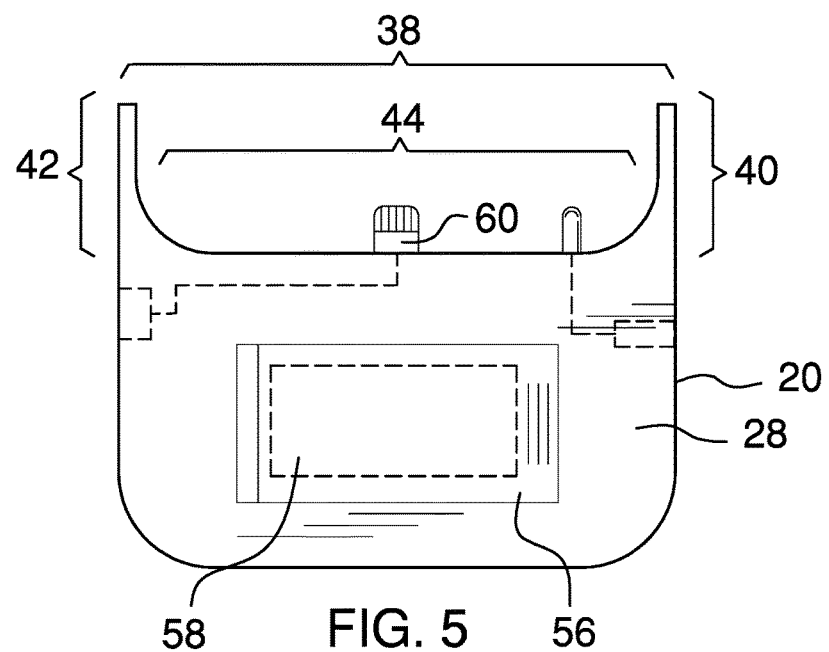
FIG. 5 is a bottom plan view.
Figure 6:
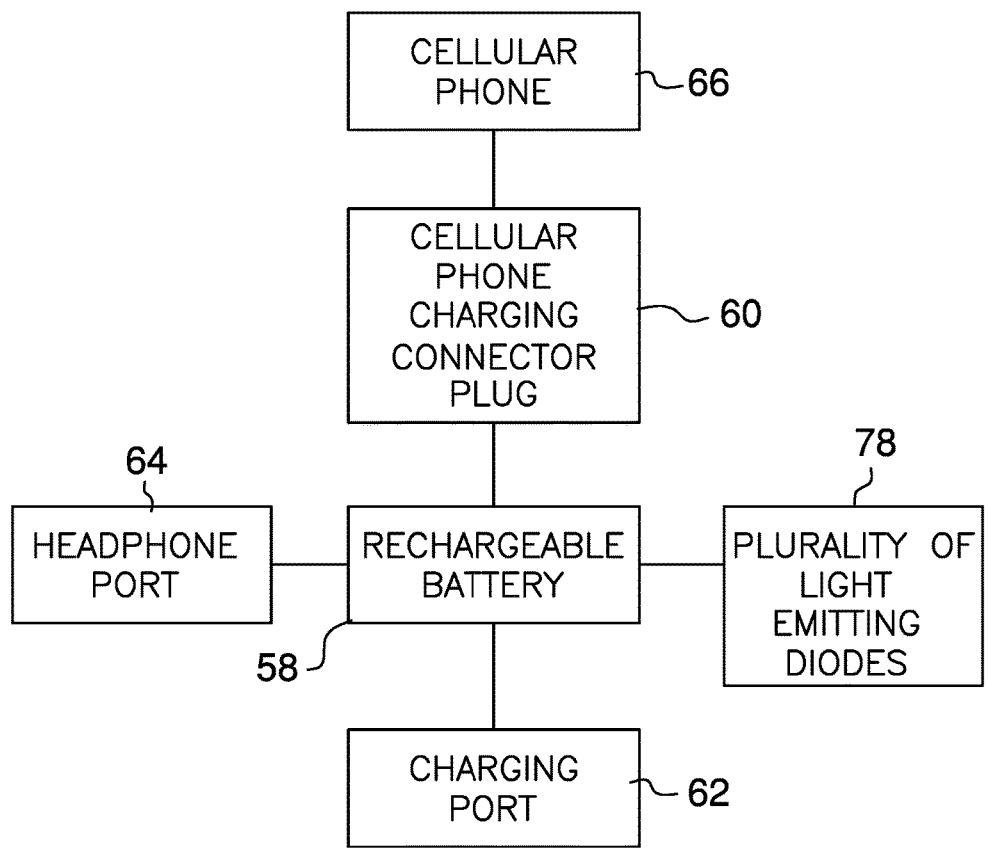
FIG. 6 is a block diagram.

With reference now to the drawings, and in particular FIGS. 1 through 6 thereof, an example of the instant attachable cosmetics case for a cellular phone employing the principles and concepts of the present attachable cosmetics case for a cellular phone and generally designated by the reference number 10 will be described.

Referring to FIGS. 1 through 6 the present attachable cosmetics case for a cellular phone 10 is illustrated. The attachable cosmetics case for a cellular phone 10 includes a substantially rectangular case 20 having a right side 22, a left side 24, a front side 26, a bottom side 28, an open top side 30, a pair of rounded lower corners 32, a continuous outer edge 34 disposed along the top side 30, a substantially rectangular primary storage compartment 36, and a concave U-shaped back side 38. The back side 38 has a rearwardly extended right wing 40, a rearwardly extended left wing 42, and an elongated substantially linear middle portion 44. A substantially rectangular top lid 46 has an interior surface 48, an exterior surface 50, and a linear top surface 52 hingedly attached to the outer edge 34 of the case 20 adjacent to the middle portion 44 of the back side 38. A perimeter of the top lid 46 substantially conforms to a perimeter of the top side 30. The top lid 46 has an open position and an alternate closed position. The top lid 46 is in the open position when a gap 54 is disposed between the top lid 46 and the top side 30. The top lid 46 is in the closed position when the top lid 46 is disposed directly atop an entirety of the top side 30.

The attachable cosmetics case for a cellular phone 10 further includes a battery compartment 56 disposed within the case 20. A rechargeable battery 58 is disposed within the battery compartment 56. A cellular phone charging connector plug 60 is medially disposed on the middle portion 44 of the back side 38 of the case 20. A charging port 62 is disposed on the right side 22 of the case 20 proximal the right wing 40 of the back side 38. A headphone port 64 is disposed on the left side 24 of the case 20 proximal the left wing 42 of the back side 38. A distance between the right wing 40 of the back side 38 of the case 20 and the left wing 42 of the back side 38 of the case 20 substantially conforms to a width of a cellular phone 66.

A plurality of substantially rectangular secondary storage compartments 68 is disposed within the primary storage compartment 36 of the case 20 proximal the front side 26. Each of the secondary storage compartments 68 is configured to fit a block of makeup 70. The plurality of secondary storage compartments 68 is optionally three. An elongated rectangular applicator compartment 72 is disposed within the primary storage compartment 36 adjacent to the plurality of secondary storage compartments 68 proximal the back side 38 of the case 20. The applicator compartment 72 is configured to fit a makeup applicator brush 74. A mirror 76 is disposed on the interior surface 48 of the top lid 46. A plurality of light emitting diodes 78 is continuously disposed between an exterior edge 80 of the mirror 76 and an external surface 82 of the top lid 46.

The case 20 is removably attachable to a cellular phone 66. Each of the rearwardly extended right wing 40 and the rearwardly extended left wing 42 is disposed immediately adjacent to a lower portion 21 of each of a right surface 23 and a left surface 25, respectively, of the cellular phone 66. The cellular phone charging connector plug 60 is disposed within a charging port 84 of the cellular phone 66, and a bottom portion 86 of the cellular phone 66 is disposed between the right wing 40 of the back side 38 of the case 20 and the left wing 42 of the back side 38 of the case 20 when the case 20 is attached to the cellular phone 66. The rechargeable battery 58, the cellular phone charging connector plug 60, the plurality of light emitting diodes 78, the charging port 62, the headphone port 64, and the cellular phone 66 are in operational communication with each other.

What is claimed is:

1. An attachable cosmetics case for a cellular phone comprising:
    a substantially rectangular case having a right side, a left side, a front side, a bottom side, an open top side, a pair of rounded lower corners, a continuous outer edge disposed along the open top side, a substantially rectangular primary storage compartment, and a concave U-shaped back side having a rearwardly extended right wing, a rearwardly extended left wing, and an elongated substantially linear middle portion;
    a substantially rectangular top lid having an interior surface, an exterior surface, and a linear top surface hingedly attached to the outer edge of the substantially rectangular case adjacent to the elongated substantially linear middle portion of the concave U-shaped back side, wherein a perimeter of the substantially rectangular top lid substantially conforms to a perimeter of the open top side;
    wherein the substantially rectangular top lid has an open position and an alternate closed position;
    wherein the substantially rectangular top lid is in the open position when a gap is disposed between the top lid and the top side;
    wherein the substantially rectangular top lid is in the closed position when the substantially rectangular top lid is disposed directly atop an entirety of the open top side; a battery compartment disposed within the substantially rectangular case;
    a rechargeable battery disposed within the battery compartment;
    a cellular phone charging connector plug medially disposed on the elongated substantially linear middle portion of the concave U-shaped back side of the substantially rectangular case;
    wherein a distance between the rearwardly extended right wing of the concave U-shaped back side of the substantially rectangular case and the rearwardly extended left wing of the concave U-shaped back side of the substantially rectangular case substantially conforms to a width of the cellular phone;
    a plurality of substantially rectangular secondary storage compartments disposed within the primary storage compartment of the substantially rectangular case proximal the front side;
    wherein each of the secondary storage compartments is configured to fit a block of makeup;
    an elongated rectangular applicator compartment disposed within the primary storage compartment adjacent to the plurality of secondary storage compartments proximal the concave U-shaped back side of the substantially rectangular case;
    wherein the elongated rectangular applicator compartment is configured to fit a makeup applicator brush; a mirror disposed on the interior surface of the substantially rectangular top lid;
    a plurality of light emitting diodes continuously disposed between an exterior edge of the mirror and an external surface of the substantially rectangular top lid;
    a charging port disposed on the right side of the substantially rectangular case proximal the rearwardly extended right wing of the concave U-shaped back side; and
    a headphone port disposed on the left side of the substantially rectangular case proximal the rearwardly extended left wing of the concave U-shaped back side;
    wherein the substantially rectangular case is removably attachable to the cellular phone;
    wherein each of the rearwardly extended right wing and the rearwardly extended left wing is disposed immediately adjacent to a lower portion of each of a right surface and a left surface, respectively, of the cellular phone;

wherein the cellular phone charging connector plug is disposed within a charging port of the cellular phone when the substantially rectangular case is attached to the cellular phone;

wherein a bottom portion of the cellular phone is disposed between the rearwardly extended right wing of the concave U-shaped back side of the substantially rectangular case and the rearwardly extended left wing of the concave U-shaped back side of the substantially rectangular case when the case is attached to the cellular phone;

wherein the rechargeable battery, the cellular phone charging connector plug, the plurality of light emitting diodes, the charging port, the headphone port, and the cellular phone are in operational communication with each other.

2. The attachable cosmetics case for the cellular phone of claim 1 wherein the plurality of secondary storage compartments is three.

\* \* \* \* \*